United States Patent [19]

Kresta et al.

[11] 4,220,728

[45] Sep. 2, 1980

[54] PROCESS OF REACTING ISOCYANATES WITH ACTIVE HYDROGEN CONTAINING COMPOUNDS USING SULFONIUM ZWITTERIONS AS INITIATORS

[75] Inventors: Jiri Kresta, Detroit, Mich.; Chen S. Shen, Strongsville, Ohio

[73] Assignee: The Dow Chemical Company, Midland, Mich.

[21] Appl. No.: 890,153

[22] Filed: Mar. 27, 1978

Related U.S. Application Data

[62] Division of Ser. No. 695,897, Jun. 14, 1976, Pat. No. 4,111,914.

[51] Int. Cl.$^2$ .................... C08G 18/06; C08G 18/14; C08G 18/16

[52] U.S. Cl. .................. 521/121; 260/553 R; 260/553 A; 260/555 R; 260/555 S; 521/157; 521/159; 521/170; 521/174; 521/175; 521/176; 521/177; 528/48; 528/73; 528/74; 528/75; 528/76; 528/77; 528/72; 528/78; 528/82; 528/83; 528/84; 528/85; 528/86; 536/18

[58] Field of Search ............... 528/48, 73, 86, 74, 528/75, 76, 77, 78, 83, 84, 85, 72, 82; 260/25 AB, 25 BD, 553 R, 553 A, 555 R, 555 S; 521/121, 157, 159, 170, 174, 175, 176, 177; 536/18

[56] References Cited

U.S. PATENT DOCUMENTS

| 3,502,710 | 3/1970 | Hatch | 528/86 |
| 3,660,431 | 5/1972 | Hatch et al. | 528/86 |
| 3,767,622 | 10/1973 | Hatch et al. | 528/86 |

*Primary Examiner*—Lester L. Lee
*Attorney, Agent, or Firm*—J. G. Carter

[57] ABSTRACT

The reaction of isocyanates with substances containing isocyanate groups or active hydrogen groups, such as hydroxyl groups, amino groups and the like, are initiated by sulfonium zwitterions such as the ar-cyclic sulfonium areneoxides. Accordingly, partially trimerized isocyanates, polyurethanes and other useful materials can be made.

23 Claims, No Drawings

PROCESS OF REACTING ISOCYANATES WITH ACTIVE HYDROGEN CONTAINING COMPOUNDS USING SULFONIUM ZWITTERIONS AS INITIATORS

This is a divisional of application Ser. No. 695,897, filed June 14, 1976, now U.S. Pat. No. 4,111,914.

BACKGROUND OF THE INVENTION

This invention pertains to a process for reacting isocyanates with substances containing isocyanate groups or active hydrogen groups such as hydroxyl, amino or like groups in the presence of a sulfonium zwitterion which initiates the reaction. This invention also relates to the products of the aforementioned reaction.

Reactions of isocyanates with active hydrogen compounds such as polyols to form polyurethanes are well known as described in *Polyurethanes: Chemistry and Technology I. Chemistry,* Saunders and Frisch, Interscience, 1962, pp. 63–128. Such reactions are commonly catalyzed by tertiary amines, organometallic compounds, phosphines, triazines and mixtures thereof. The polyurethanes are usually produced in the form of foams, elastomers, coatings, adhesives, fibers and films, and most often as flexible and rigid foams.

In the production of foams, the cellular polyurethane is made by reacting an isocyanate with polyol—generally a polyfunctional hydroxyl-terminated polyether or polyester—in a formulation also containing a blowing agent and a surfactant in addition to the reactants and catalyst. By proper choice of isocyanate and polyol, foams can be made with properties ranging from flexible to semi-rigid to rigid. As is well known, the polyurethane foams, particularly the rigid foams, are excellent thermal insulators in a wide variety of applications, especially in the refrigerant and construction industries.

Unfortunately, the flammability and smoke evolutionary character of polyurethane foams has significantly limited the use of such foams in many applications. Conventionally, the burning characteristics of polyurethane foams are reduced by adding halogenated organic materials or combinations thereof with phosphorus compounds to the polyurethane formulation. More recently, improved heat resistant polyurethanes have been made by introducing heat resistant groups such as isocyanurates (often called isocyanurate rings) into the polyurethane network. In addition to high thermal stability, these isocyanurate rings and the polyurethanes containing them also exhibit hydrolytic stability. Moreover, foamed polyurethanes containing the isocyanurate groups exhibit improved dimensional stability.

One of the best methods for introducing the isocyanurate groups into the polyurethane is to employ partially trimerized isocyanate or similar isocyanate-terminated oligomers (often called NCO-terminated prepolymers) as at least a part of the isocyanate component in the polyurethane formulation. Alternatively, the isocyanurate groups may be introduced simultaneously with the formation of the polyurethanes (so-called one-step method) by reacting isocyanate and polyol in one vessel in the presence of the catalyst. Such NCO-terminated oligomers are conventionally formed by contacting an isocyanate with a catalyst which may be an amine, phosphine, metal alkoxide, metal oxides, organometallics, metal chelates and combinations thereof. Unfortunately, relatively large amounts of catalyst are required to produce the desired trimerization, particularly in the preparation of isocyanurate foams. The presence of the larger amounts of catalysts, particularly the amine or metal catalysts, often cause degradation where the reaction product is subjected to elevated temperatures. Also, the amine catalysts are notorious for causing odor problems.

More importantly, partially trimerized isocyanates and other NCO-terminated oligomers prepared by using the aforementioned conventional catalysts are not sufficiently stable to withstand the conditions of lengthy storage and/or shipping. As a result such oligomers undergo significant additional polymerization (often to and beyond the point of gelation) before actual use. It is believed that such instability toward further molecular weight increase is caused by residues of catalyst remaining in the oligomers.

In the preparation of flexible polyurethane foams wherein foaming is partly caused by $CO_2$ released from the reaction water with isocyanate groups, a dual catalyst is required in order to obtain a foam having acceptable physical properties and/or to facilitate processing. This dual catalyst commonly consists of a tertiary amine and an organometallic compound. Due to the instability of the organometallic compound, usually a tin alkanoate such as tin octoate, these dual catalysts have to be carefully metered in separate streams in commercial foam machines. Also, the amine compound causes undesirable odor problems.

In view of the aforementioned difficulties with the conventional catalysts employed in the reactions of isocyanates, it would be highly desirable to provide more stable, NCO-terminated isocyanurate oligomers (often called partially trimerized isocyanates) as well as an improved process for carrying out isocyanate reactions in general.

SUMMARY OF THE INVENTION

The present invention, in its broadest aspect, is a process for reacting compounds, including polymers, containing at least one isocyanate (NCO) group, hereinafter called an organic NCO-containing material or more briefly an isocyanate, with (1) another isocyanate group or (2) an active hydrogen compound, polymer or mixture thereof, hereinafter called active hydrogen compound in the presence of sufficient ar-sulfonium areneoxide to initiate the reaction.

With respect to the first type of reaction, the reactions of particular interest are those wherein the isocyanate reacts with itself or another isocyanate (so-called isocyanate polymerization) to form partially trimerized isocyanates and other NCO-terminated isocyanurate oligomers. Of lesser interest are the reactions wherein the isocyanate reacts with itself or another isocyanate to form a trimer or other isocyanurate polymer which does not contain free or unreacted isocyanate groups. In all cases the resulting isocyanurate polymer generally has at least one ring structure (so-called isocyanurate ring) represented by the formula:

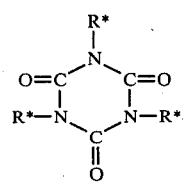

wherein R* is the organic moiety of the isocyanate. In the partially trimerized isocyanates and other NCO-terminated oligomers, R* contains one or more terminal NCO groups. Alternatively the polymerization reaction of the first type may proceed to form a linear polymer such as 1-nylon represented by the formula:

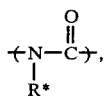

or to form a carbodiimide represented by the formula, R*—N=C=N—R* wherein R* is as defined before.

With respect to the second type of reaction, the isocyanate reacts with alcohols to form urethanes (often called carbamates) with polyols to form polyurethanes, with water or an amine to form a urea, and with other active hydrogen compounds as defined by the Zerewitinoff reaction, i.e., an active hydrogen compound will react with $CH_3MgX$ to generate methane.

The present invention, in a narrower aspect, is a stable partially trimerized isocyanate (so-called NCO-terminated isocyanurate oligomer) and a method for preparing same wherein the method comprises contacting an isocyanate with an ar-sulfonium areneoxide in an amount effective to initiate the partial trimerization of the isocyanate to form the desired NCO-terminated oligomer. For the purposes of this invention, the term "oligomer" shall mean a polymer containing generally less than 20 monomer units, preferably from about 3 to about 15 monomer units, most preferably from about 3 to about 9 monomer units.

Another narrower aspect of the present invention is a method wherein an active hydrogen compound is contacted with the isocyanate in the presence of an ar-sulfonium areneoxide such that the areneoxide initiates, or under some conditions catalyzes, the reaction of the isocyanate with the active hydrogen compound.

Other aspects of the present invention include polyurethanes such as foams, elastomers and the like prepared from compositions containing, as an initiator, the ar-sulfonium areneoxide (herein called sulfonium zwitterion).

Surprisingly, it is found that the substitution of the aforementioned sulfonium zwitterion for a conventional isocyanate polymerization catalyst yields an NCO-terminated isocyanurate polymer which is unusually resistant (stable) to further polymerization. Also surprising is the extremely high efficiency exhibited by the zwitterion as an initiator for all isocyanate reactions including the reaction of isocyanate with active hydrogen compounds such as polyols to form polyurethanes. In the latter reaction, the sulfonium zwitterion can, under certain conditions, act essentially the same as a catalyst in that the sulfonium zwitterion is consumed at a very slow rate with respect to the polyurethane formulation. In this sense, the zwitterion is highly efficient in terms of faster rates of polymerizaton. In addition, the sulfonium zwitterion is useful as the sole initiator in preparation of flexible polyurethane foams which, heretofore, have required a catalyst system having at least two components for their preparation. Also, rigid polyurethane isocyanurate foams produced in the practice of this invention tend to be less friable, i.e., more resistant to abrasion. Of course, the sulfonium zwitterion initiates the reaction of the isocyanate groups with any compounds or polymers containing active hydrogen groups such as hydroxyl, amino, amido, and carboxyl as well.

DETAILED DESCRIPTION OF THE EMBODIMENT

Generally, the sulfonium zwitterions employed as initiators in the practice of this invention are characterized by the presence of an aromatic ring structure bearing an anionic oxide and a cationic sulfonium group.

Preferably, such zwitterions are those corresponding to the formula:

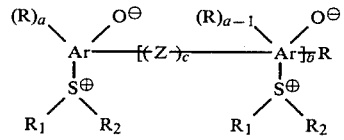

wherein each Ar is independently a cyclic aromatic polyyl, each R is independently a suitable inert monovalent radical capable of existing as a substituent on Ar, each Z is independently a suitably inert divalent radical capable of bridging aromatic moieties such as Ar, each $R_1$ and each $R_2$ are independently suitably inert monovalent organic radicals and/or each $R_1$ and $R_2$ are collectively a suitably inert divalent organic radical capable of forming a heterocyclic ring with

a is a positive integer corresponding to the remaining available positions on Ar, b is 0 or a positive integer, preferably 1 to 5, and c is 0 or 1. The term "aromatic polyyl" means a polyvalent (more than 1) aromatic radical having at least one aromatic carbocyclic ring. For example, benzene as a polyyl has a maximum functionality (sites available for substitution) of six, the maximum functionality of a naphthalene polyyl is eight and the maximum functionality of an anthracene polyyl is ten.

More particularly, Ar is an aromatic polyyl containing at least one carbocyclic aromatic ring and includes mononuclear aromatic carbocyclic polyyls, polynuclear aromatic carbocyclic or polyyl aromatic carbocyclic/(N, O or S) heterocyclic polyyl including fused and nonfused polynuclear aromatic polyyls. A carbocyclic/N, O or S) heterocyclic polyyl is one having at least one carbocyclic ring fused with or bonded to one or more five or six membered heterocyclic rings, each heterocyclic ring containing only one of N, S or O, provided that the heterocyclic ring containing —N— is a six membered ring. Examples of suitable carbocyclic heterocyclic polyyls include polyyls of quinoline, isoquinoline, acridine, benzoquinoline, 1-azophenanthrene, benzofuran, benzothiophene and the like. Preferably Ar is an arene polyyl, e.g., polyyls of benzene, naphthalene, anthracene, biphenyl, and 1,2-diphenylethene. Especially preferred are polyyls of benzene and naphthalene, with the polyyls of benzene being most preferred.

R is a suitably inert monovalent radical which is capable of existing as a substituent on Ar. Examples include H, X such as Cl or Br, OH, R', —OR', —SR',

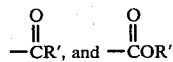

wherein R' is hydrocarbyl or substituted hydrocarbyl. Hydrocarbyl is a hydrocarbon radical having from 1 to 20 carbons, preferably alkyl, cycloalkyl, alkenyl, aryl, alkylaryl, aralkyl and similar hydrocarbon radicals having 1 to 8 carbons. Exemplary substituents of substituted hydrocarbyl include X, OH, —OR', —SR' and the like wherein X and R' are as defined hereinbefore. Preferably, R is hydrogen, hydroxyl, $C_1$–$C_8$ alkyl, $C_1$–$C_8$ alkoxy with hydrogen and $C_1$–$C_4$ alkyl being especially preferred. It is understood that the use of R groups other than hydrogen, particularly very bulky groups such as higher hydrocarbyls and ring deactivating groups such as halogen will be limited as necessary to insure formation of a stable ar-sulfonium arenol salt as well as the corresponding sulfonium zwitterion. Moreover, in the trimerization of isocyanate, it is observed that electron-releasing R groups such as alkyl, e.g. methyl, increase the rate activity of the initiator when such electron-releasing groups are in positions that are ortho to the anionic oxide group. It has been observed, however, that, in the reaction of isocyanate with active hydrogen compound, the presence of any substituent group such as methyl or chlorine in the positions ortho to anionic oxide group reduces the activity of the zwitterion.

Z is a suitably inert divalent radical capable of bridging aromatic rings each bearing a ring substituted oxide anion and a sulfonium cation. Suitable examples of Z include —O—, —S—,

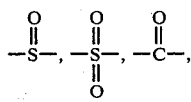

—$R_3$—, —O$R_3$O—, —S$R_3$S—, —$R_3$O—, —$R_3$S—,

and the like wherein $R_3$ is hydrocarbylene or substituted hydrocarbylene with substituents as defined for R hereinbefore. Hydrocarbylene is preferably a divalent hydrocarbon radical having from 1 to 8 carbon atoms, more preferably from 2 to 4 carbon atoms. Preferred examples of Z include —S—, —O—, alkylene, alkenylene, cycloalkylene, arylene, alkylenearylenealkylene, and oxyalkyleneoxy. Especially preferred are —O($C_mH_{2m}$)O—,

or —CH$_2$— wherein m=1–4 and R″=$C_1$–$C_4$ alkyl.

Individually, each $R_1$ and $R_2$ are suitably inert monovalent organic radicals such as hydrocarbyl or substituted hydrocarbyl as set forth in the definition of R. Suitable examples include alkyl, aryl, cycloalkyl, alkylaryl, alkaryl, alkylthioalkyl, alkoxyalkyl and the like. Preferred are $C_6$–$C_8$ aryl such as phenyl or tolyl or $C_1$–$C_8$ alkyl wherein the carbons in position alpha to

are preferably methylene or methyl. Examples of preferred alkyls include methyl, ethyl, propyl, butyl or octyl with the most preferred being the $C_1$–$C_4$ alkyls.

The cyclic sulfonium zwitterions wherein $R_1$ and $R_2$ are collectively a divalent radical (—$R_1R_2$—) are generally more desirable than the non-cyclic sulfonium zwitterions wherein $R_1$ and $R_2$ are individually monovalent radicals. Collectively $R_1$ and $R_2$ are suitably inert divalent organic radicals that are capable of forming a heterocyclic ring with divalent sulfur. It is also understood that the resulting heterocyclic ring is capable of existing as a cyclic sulfonium group bonded to an aromatic ring of Ar. Suitable examples of —$R_1R_2$— include hydrocarbylene, substituted hydrocarbylene and unsubstituted or substituted heterohydrocarbylene wherein the chain of hydrocarbon is interrupted by a hetero atom, e.g., oxygen or sulfur. By hydrocarbylene is meant a divalent hydrocarbon radical, e.g., alkylene. Hydrocarbylene and substituted hydrocarbylene suitably contain a chain having a number of carbon atoms sufficient to provide a 5- to 7-membered heterocyclic ring including

The cyclic sulfonium moiety is usually substituted in a ring position on Ar that is ortho or para to the anionic oxide moiety. Heterohydrocarbylene suitably contains a chain having a number of carbon atoms sufficient to provide a 5- to 7-membered heterocyclic ring including the hetero atom and

In all cases, the 5- or 6-membered ring sulfonium moieties are preferred, with the 5-membered ones being most preferred. In all suitable —$R_1R_2$—, the two carbons of —$R_1R_2$— bonded to

are methylene. Exemplary hydrocarbylenes and heterohydrocarbylenes include alkylene, cycloalkylene, alkenylene, alkylenearylenealkylene, alkyleneoxyalkylene and alkylenethioalkylene. Exemplary suitable substituents of substituted hydrocarbylene and heterocarbylene include monovalent radicals given in the definition of R such as OH, R', —OR', and —SR' where R' is hydrocarbyl, preferably alkyl or aryl. Preferably, $R_1$ and $R_2$ are collectively the substituted or unsubstituted hydrocarbylenes such as —(CH$_2$)$_4$—, —(CH$_2$)$_5$—,

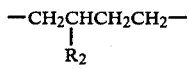

wherein $R_2$ is $C_1-C_4$ alkyl or aryl (e.g., phenyl or alkaryl such as tolyl),

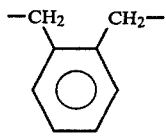

or heterohydrocarbylene such as $-(CH_2)_2O(CH_2)-$. Of the foregoing, $-(CH_2)_4-$ and

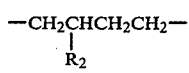

are especially preferred.

Most of the more desirable sulfonium zwitterions include a molecule or more of water (usually 2) per molecule of zwitterions, while other zwitterions contain no water or somewhat less than one molecule of water in their molecule structure.

Examples of the preferred sulfonium zwitterions include those represented by the following formulas:

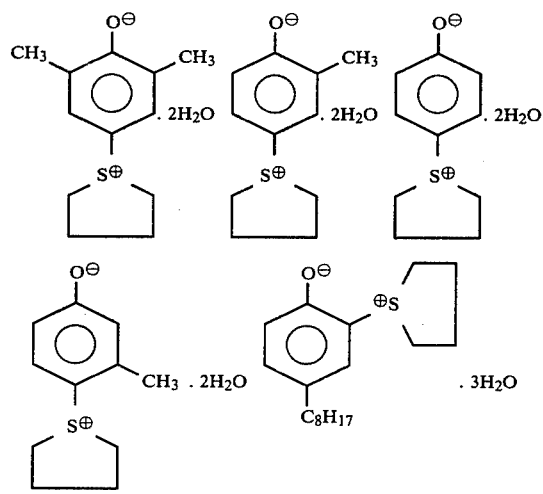

Examples of suitable but less preferred zwitterions include those represented by the following formulas:

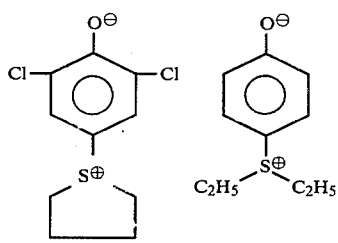

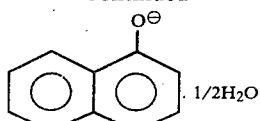

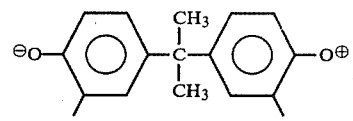

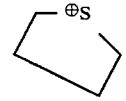 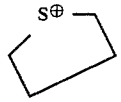

The aforementioned zwitterions are suitably prepared by the methods and procedures described in U.S. Pat. Nos. 3,636,052, 3,660,431 and 3,749,737-9.

For the purposes of this invention, the term "isocyanate" means any compound or polymer that contains at least one isocyanate (—NCO) group such as monoisocyanates (having the formula R*NCO wherein R* is a monovalent organic radical as defined hereinafter) and polyisocyanates. Of particular interest are the organic diisocyanates and other organic polyisocyanates represented by the formula: $R^*(NCO)_z$ wherein R* is a polyvalent organic radical which is preferably aliphatic, aromatic or mixtures thereof and z is an integer of one or more that corresponds to the valence of R*. Preferably, Z is 2 to 4, most preferably 2 to 3. Exemplary R* include alkyl, cycloalkyl, aryl, aralkyl and the like. Of course, it is generally desirable that R* be substantially non-reactive with the sulfonium zwitterion such that it does not destroy the ability of the zwitterion to act as an initiator.

Illustrative isocyanates suitably employed in the practice of the present invention include aliphatic and aromatic isocyanates such as, for example, 2,4-toluene diisocyanate
2,6-toluene diisocyanate
ethylene diisocyanate
hexamethylene diisocyanate
dicyclohexylmethane-4,4'-diisocyanate
1,3-bis(isocyanatomethyl)benzene
isophorone diisocyanate
polymethylene polyphenyl polydiisocyanate
1,5-naphthalene diisocyanate
cumene-2,4-diisocyanate
4-methoxy-1,3-phenylene diisocyanate
4-chloro-1,3-phenylene diisocyanate
4-bromo-1,3-phenylene diisocyanate
4-ethoxy-1,3-phenylene diisocyanate
2,4'-diisocyanatodiphenylether
5,6-dimethyl-1,3-phenylene diisocyanate
2,4-dimethyl-1,3-phenylene diisocyanate
4,4'-diisocyanatodiphenylether
benzidinediisocyanate
4,6-dimethyl-1,3-phenylene diisocyanate
9,10-anthracenediisocyanate
4,4'-diisocyanatodibenzyl
3,3'-dimethyl-4,4'-diisocyanatodiphenylmethane
2,6'-dimethyl-4,4'-diisocyanatodiphenyl 2,4-diisocyanatostilbene
3,3'-dimethyl-4,4'-diisocyanatodiphenyl
3,3'-dimethoxy-4,4'-diisocyanatodiphenyl
1,4-anthracenediisocyanate
2,5-fluorenediisocyanate
1,8-naphthalenediisocyanate
2,6-diisocyanatobenzfuran
2,4,5-toluene triisocyanate,
2,4,4'-triisocyanatodiphenylether,
4,4'-di-isocyanatophenyl methane,
4,2'-di-isocyanatophenyl methane,
2,2'-di-isocyanatophenyl methane, and
mixtures thereof.

Also suitable are polyisocyanates of higher functionality such as dimers and particularly NCO-terminated oligomers of isocyanates containing isocyanurate rings as well as prepolymers and mixtures of the aforementioned isocyanates. Also suitable are those sometimes referred to as quasiprepolymers of such isocyanates prepared by reacting an excess of isocyanate with an active hydrogen compound such as a polyol, preferably those made by reacting at least 2 moles of isocyanate group with one mole of active hydrogen.

Other organic polyisocyanates are the polyisocyanates described in Canadian Pat. No. 700,026 and in U.S. Pat. No. 2,683,730; the phenyl indane diisocyanates which are described in U.S. Pat. No. 2,855,385, the organic diisocyanates which are described in U.S. Pat. No. 2,292,443; and the organic triisocyanates which are described in U.S. Pat. No. 2,292,443; and the organic triisocyanates which are described in U.S. Pat. No. 2,929,794.

Suitable isocyanates also include monoisocyanates such as phenyl isocyanate, cresyl isocyanate and the like.

Of the foregoing isocyanates, the following isocyanates are preferred: 2,4-toluene diisocyanate, mixtures of 2,4- and 2,6-toluene diisocyanate, 1,3-bis-(isocyanatomethyl)benzene, polymethylene polyphenyl polyisocyanate, hexamethylene diisocyanate, dicyclohexylmethane-4,4'-diisocyanate, isophorone diisocyanate, 4,4'-di-isocyanatophenyl methane, 4,2'-di-isocyanatophenyl methane, 2,2'-di-isocyanatophenyl methane. Most preferred are 2,4-toluene diisocyanate, 1,3-bis(isocyanatomethyl)benzene and polymethylene polyphenyl polyisocyanate and mixtures of 2,4-toluene diisocyanate with 2,6-toluene diisocyanate.

Active hydrogen compounds suitably reacted with the isocyanate in the practice of this invention include any compounds or polymers containing at least one active hydrogen as determined by the Zerewitinoff method as described by Kohler in *Journal of the American Chemical Society*, 49, 3181(1927). Exemplary active hydrogen compounds are those containing —OH, —NH$_2$, —NH—, —COOH, —SH and others as described in U.S. Pat. No. 3,887,501. Of particular interest are the hydroxyl-containing compounds and polymers most often employed in the production of polyurethanes.

Examples of such suitable hydroxyl-containing compounds are the following, including mixtures thereof:

(A) monomeric polyhydroxyl containing compounds such as ethylene glycol, propylene glycol, butylene glycol, glycerine, trimethylol propane and the like;

(B) polyoxyalkylene polyols including the adducts of alkylene oxides or halogenated alkylene oxides with, for example, water, ethylene glycol, diethylene glycol, propylene glycol, dipropylene glycol, glycerol, 1,2,6-hexanetriol, 1,1,1-trimethylolethane, 1,1,1-trimethylolpropane, pentaerythritol, sorbitol, sucrose, lactose, alpha-methylglycoside, alpha-hydroxyalkylglucoside, ammonia, triethanolamine, triisopropanolamine, ethylenediamine, diethylenetriamine, novolac resins, phosphoric acid, polyphosphoric acids such as tripolyphosphoric acid and tetrapolyphosphoric acid, phenol aniline-formaldehyde ternary condensation products, aniline-formaldehyde condensation products and the like (The alkylene oxides employed, i.e., to produce the polyoxyalkylene polyols normally have from 2 to 4 carbon atoms. Propylene oxide and mixtures of propylene oxide with ethylene oxide are preferred. Also noteworthy are the halogenated alkylene oxides such as 4,4,4-trichloro-1,2-butylene oxide. It is known that the random or block structures can be obtained depending upon the particular known procedures used for their preparation.);

(C) polyesters of polyhydric alcohols and polycarboxylic acid such as those prepared by the reaction of an excess of ethylene glycol propylene glycol, 1,1,1-trimethylolpropane, glycerol, or the like, with phthalic acid, adipic acid, chlorendic acid and the like;

(D) lactone polyols prepared by reacting a lactone such as epsilon-caprolactone or a mixture of epsilon-caprolactone and an alkylene oxide with a polyfunctional initiator such as a polyhydric alcohol, an amine, or an amino-alcohol;

(E) phosphorus-containing derivatives such as tris(dipropylene)glycol phosphite and other phosphites;

(F) the polymer/polyols produced by the in situ polymerization of a vinyl monomer in a polyol, as disclosed in U.S. Pat. No. 3,304,273; U.S. Pat. No. 3,383,351 and U.S. Pat. No. 3,523,093.

The foregoing are merely illustrative and represent only a small number of the many polyols known in the art that can be suitably employed in the process of this invention. Of the aforementioned hydroxy-containing materials, the preferred ones are as follows: alkylene oxides or halogenated alkylene oxides such as adducts of ethylene oxide, propylene oxide, trichlorobutene oxide or mixtures thereof with alkylene glycols such as ethylene glycol, propylene glycol, dipropylene glycol or mixtures thereof; glycerine, 1,1,1-trimethylolpropane, pentaerythritol, sorbitol, sucrose or mixtures thereof; polymer/polyols based on polyether glycols or triols; and ethylenediamine or aminoethylethanol amine. Most preferred are adducts of ethylene oxide, propylene oxide or mixtures thereof with glycerine, 1,1,1-trimethylolpropane, sucrose, pentaerythritol or sorbitol.

Suitable active hydrogen for making compounds for making urethanes (carbamates) also include alcohols such as methanol, ethanol, n-propanol, isopropanol, n-butanol, n-decanol, phenol, xylenol and the like. Also suitable active hydrogen compounds are water, ammonia or other organic primary or secondary amines including polyamines such as ethylene diamine.

The employment of water as a portion of the active hydrogen component is of particular interest in the manufacture of flexible polyurethane foams wherein the water reacts with a portion of the isocyanate to from urea and carbon dioxide. The carbon dioxide serves as the blowing agent needed to form the foam. Accordingly, an exemplary polyurethane formulation for making such a foam product would include water, a polyol, a suitable isocyanate and the sulfonium zwitterion.

The particular isocyanate and active hydrogen compound as well as quantities thereof to be employed depends upon the particular end use application desired. Such choice is within the realm of those skilled in the art to which such end use is directed. Such choices are readily described in *Polyurethanes: Chemistry and Technology II. Technology,* Saunders and Frisch, Intersciences, 1964. Similarly, there are described procedures useful for the other isocyanate reactions as well as other ingredients that may be employed. For example, the reaction of the isocyanate to form carbodiimide is described at page 93 of Saunders and Frisch, supra and the 1-nylon resulting from the homopolymerization of the isocyanate is described at page 99 of Saunders and Frisch, supra. Accordingly, the sulfonium zwitterion can be employed as an initiator for isocyanate reactions according to the procedures and under the conditions described in Saunders and Frisch, supra which is hereby incorporated by reference in its entirety.

Foams and the like containing both urethane and isocyanate linkages and their methods of preparation are described in U.S. Pat. Nos. 3,516,950 and 3,723,367. Such methods of preparation can be generally employed in the practice of this invention the sulfonium zwitterion is employed as part or all of the initiator.

The quantity of sulfonium zwitterion initiator to be employed is that quantity necessary to initiate the reaction so as to produce the desired reaction product. In general, such quantities include, for example, from about 0.0001 to about 0.1 mole of sulfonium zwitterion per mole of NCO group. In the preparation of partially trimerized isocyanates, the quantity of initiator is preferably from about 0.0001 to about 0.001 moles of sulfonium zwitterion per mole of NCO group. On the other hand, rigid polyurethane foams are most advantageously prepared using from about 0.0001 to about 0.1, preferably from about 0.001 to about 0.03, moles of zwitterion per mole of NCO group. From the foregoing information, those skilled in the art can readily ascertain the optimum quantities required to produce the desired result, i.e., to produce the desired reaction product. As will be observed by the artisan knowledgeable of isocyanate reactions, significantly lesser quantities of the sulfonium zwitterion are required to initiate the desired isocyanate reaction than is required of conventional catalysts.

Ordinary temperatures and pressures are likewise employed which may range from about $-100°$ to about $130°$ C., generally from about $-100°$ to about $100°$ C., at atmospheric to above atmospheric pressure as well as below atmospheric pressure. Of course, it should be recognized that the most advantageous temperatures are those at which the zwitterion is relatively stable and the reactants are generally soluble in the desired reaction solvent. Accordingly, those skilled in the art can readily ascertain the optimum conditions required to produce the desired results.

In carrying out the process of this invention, it is particularly desirable to dissolve the zwitterion initiator in a suitable solvent prior to contacting it with isocyanate. Suitable solvents are those materials that dissolve an appreciable amount of the zwitterion, e.g., at least enough to provide at least an 0.01 weight percent solution of the zwitterion, and do not react with the zwitterion. Advantageously, the solvents are aliphatic nitriles such as acetonitrile; polyols such as ethylene glycol, diethylene glycol, propylene glycol, dipropylene glycol, and the like; alcohols such as methanol, ethanol and cyclohexanol; and similar materials. Advantageously, the zwitterion and solvent are combined to form 0.01 to 30 weight percent solutions of the zwitterion. In the preparation of the NCO-terminated oligomers, the zwitterion concentration in the solution is advantageously from about 10 to 20 weight percent. In the preparation of polyurethanes, the zwitterion concentration is advantageously from about 0.1 to about 30 weight percent.

In the preparation of the NCO-terminated oligomers by the process of this invention, it is particularly advantageous to form the oligomer by a reverse addition technique wherein the isocyanate is added slowly to a solution of the catalyst. Such technique is particularly effective in making oligomers from mixtures of 2,4-toluene diisocyanate and 2,6-toluene diisocyanate. Otherwise in the practice of this invention, the order of addition of reactants and initiator is not particularly important and conventional techniques are usually employed.

Also in the process of the present invention, while not necessary, other catalysts can be employed along with the sulfonium zwitterions. Such catalysts can include but are not limited to tertiary amines such as, for example, triethylene diamine, bis(2-dimethylaminoethyl)ether, N-ethylmorpholine, N-(dimethylaminoethyl), piperazine, tetramethylbutanediamine, dimethylethanolamine, organometal catalysts such as, for example, stannous octoate, dibutyltindilaurate, sodium methylmercaptide, potassium methylmercaptide, lithium methylmercaptide, sodium 2-hydroxyethyl-mercaptide, potassium tetradecylmercaptide, potassium octoate mixtures thereof and the like.

If desired the reactions of isocyanate containing compounds with other isocyanate-containing or active hydrogencontaining compounds can be carried out in the presence of solvents. Suitable solvents include any such solvents which are non-reactive with either the reactants or the sulfonium zwitterion catalyst. Representative suitable solvents are those normally employed in isocyanate reactions, for example, alkyl esters or carboxylic acids such as butyl acetate, ethyl acetate, butyl propionate and ethyl butyrate; aliphatic nitriles such as acetonitrile and propionitrile; ketones such as methyl ethyl ketone, dibutyl ketone, diethyl ketone, cyclohexanone and acetophenone; aromatic hydrocarbons such as benzene and toluene; amides such as dimethyl formamide and dimethyl acetamine; ethers such as dibutyl ether and dipropyl ethers; and chlorinated hydrocarbons such as perchloroethane.

In the preparation of foams, other additives are optionally included such as polyisocyanate catalysts and blowing agents or other well known substances such as fillers, dyes, pigments, crosslinkers or chain extenders, flame retarding or smoke suppressing agents and the like.

The following examples are illustrative of the present invention but are not to be construed as to limit the scope thereof in any manner. Unless otherwise indicated, all parts and percentages in the following examples are by weight.

In the following Examples 1–6, the components employed are described below.

Polyol A—was a flame retardant polyol having an OH number of 285 and an equivalent weight of 196.8 commercially available from the Upjohn Co. as ISONOL 36.

of acetonitrile was slowly added and the resultant mixture was intensively mixed for about 4 hours. The resultant trimer solution had an NCO equivalent weight of about 140 and is referred to as Polyisocyanate C.

B. Preparation of Urethane Foam Using Polyisocyanate C

The procedure of Example 2 was employed with the following components:
  60 parts by weight of Polyol C
  40 parts by weight of Polyol D
  0.36 part by weight of Catalyst B
  0.1 part by weight of Catalyst C
  0.3 part by weight of Catalyst E
  0.015 part by weight of Catalyst D
  2.8 parts by weight of water
  54.2 parts by weight of Polyisocyanate C
  NCO:OH ratio was 1.05:1 (Isocyanate Index=105)

The resulting foam had a density of 2.54 lbs/ft$^3$ (0.04 g/cc).

EXAMPLE 4 (Isocyanurate-Urethane Coating)

A. Preparation of a Solution of Partially Trimerized 2,4-Toluene Diisocyanate

The procedure of Example 3 was employed with the following components except that the reaction was completed in 17 hours and then observed for 90 days as described in B hereinafter:
  100 ml of a 50% solution of 2,4-toluene diisocyanate dissolved in butyl acetate
  0.00591 g of Initiator A dissolved in 0.96 ml of acetonitrile.

The resultant solution contained partially trimerized toluene diisocyanate having an NCO equivalent weight of about 420 and is referred to as Polyisocyanate D.

B. Stability of Partially Trimerized Toluene Diisocyanate

The indicated proportions of components in A above were placed in two reaction vessels. One was maintained at 25° C. and the other at 50° C. The percent NCO and percent conversion were measured periodically. The results are given below:

| Time, days | 25° C. | | 50° C. | |
|---|---|---|---|---|
| | % NCO | % Conv. | % NCO | % Conv. |
| 0 | 30 | 0 | 30 | 0 |
| 1 | 10.93 | 63.4 | 10.93 | 63.4 |
| 7 | 10.43 | 65.3 | 10.05 | 66.5 |
| 18 | 10.4 | 65.3 | 10.05 | 66.5 |
| 24 | 10.39 | 65.3 | 10.05 | 66.5 |
| 30 | 10.3 | 65.6 | 10.05 | 66.5 |
| 60 | 10.06 | 66.4 | 10.01 | 66.6 |
| 90 | 10.0 | 66.7 | 10.01 | 66.6 |

As evidenced by the foregoing data, the partially trimerized isocyanates (NCO-terminated isocyanurate oligomers) made in the practice of the present invention are stable (do not undergo further significant conversion).

C. Preparation of Isocyanurate-Urethane Coating

Components:
  100 parts by weight of Polyol E
  100 parts by weight of butyl acetate solvent
  0.03 part by weight of Catalyst D
  109.3 parts by weight of Polyisocyanate D
  NCO:OH ratio was 1:1 (Isocyanate Index=100)

The above components were mixed together and the resultant mixture was drawn down on a metal panel with an 8 draw-down bar. After baking at 100° C. for 10 hours, the coatings had the following properties:

| Tensile strength | 1207.7 psi |
| --- | --- |
| | (893.3 kg/cm$^2$) |
| Elongation | 67% |
| Impact strength | >160 in. lb. |
| Hardness, Sward Rocker | 11 |

EXAMPLE 5 (Isocyanurate-Urethane Elastomer)

Components:
  100 parts by weight of Polyol F
  0.06 part by weight Catalyst D
  29.4 parts by weight Polyisocyanate C
  NCO:OH ratio=1.05:1 (Isocyanate Index=105)

The above components were blended and degassed under a vacuum. The resulting degassed mixture was then poured into a 100° C. preheated mold and maintained thereat under 13000 psi (913.9 kg/cm$^2$) pressure for 18 hours. The resultant properties were obtained by ASTM-D-412.

| Tensile strength | 581 psi (40.8 kg/cm$^2$) |
| --- | --- |
| Elongation | 156% |
| Hardness, Shore A | 67 |

EXAMPLE 6

Various zwitterion initiators were employed in the reaction of isocyanates with an isocyanate or an active hydrogen-containing compound. The following reactants, solvents and initiators are indicated in the following Table I which also indicates the reaction conditions and results.

Other Reactant A—was water.
Other Reactant B—was n-propanol.
Other Reactant C—was ethanol.
Other Reactant D—was isopropanol.
Isocyanate A—Polyisocyanate A as defined hereinbefore.
Isocyanate F—was phenyl isocyanate.
Isocyanate G—was an 80/20 mixture of 2,4-/2,6-toluene diisocyanate.
Isocyanate H—was a polymethylene polyphenyl polyisocyanate having a NCO equivalent weight of 133.76 and obtained from Mobay Chemical Company as MONDUR MR.
Isocyanate I—was hexamethylene diisocyanate.
Solvent A—was acetonitrile.
Solvent B—was butyl acetate.
Solvent C—was methylethylketone.
Initiator A—was Initiator A as defined herein before.
Initiator F—was 4-tetrahydrothiophenium phenoxide represented by the formula:

Polyol B—was a polyoxyethylene glycol having an OH number of 563.8 and an equivalent weight of 99.5.

Polyol C—was a graft copolymer of a polyether triol containing acrylonitrile and styrene grafts having an OH number of 36 and an equivalent weight of 155.83 commercially available from Union Carbide Corp. as NIAX 11-34.

Polyol D—was a graft copolymer of a polyether triol containing acrylonitrile and styrene grafts having an OH number of 27.05 and an equivalent weight of 2073.9 commercially available from Union Carbide Corp. as NIAX 34-28.

Polyol E—was a poly(oxypropylene) glycol having an OH equivalent weight of about 350 which is commercially available from BASF Wyandotte as Pluracol P710.

Polyol F—was a poly(1,4-oxybutylene)glycol having a number average molecular weight of 1000 and is commercially available from Quaker Oats as POLYMEG 1000.

Polyisocyanate A—was a phosphorus-containing, modified polymethylene polyphenyl polyisocyanate having an equivalent weight of 157 commercially available from The Upjohn Co. as PAPI 105.

Polyisocyanate B—was a combination of toluene diisocyanate (80%) and polymeric isocyanate (20%) having an NCO content of 44.5% and an equivalent weight of 94.38 commercially available from Union Carbide Corp. as ISOCYANATE SF-58.

Polyisocyanate C—was a partially trimerized 2,4-toluene diisocyanate having an equivalent weight of 140 (Example 3).

Polyisocyanate D—was a partially trimerized 2,4-toluene diisocyanate dissolved in butyl acetate, the trimer having equivalent weight of 420 (Example 4).

Polyisocyante E—was a 50 percent solution of partially trimerized 2,4-toluene diisocyanate in butyl acetate. The trimer had an NCO content of 8.65% and an equivalent weight of 486.1 commercially available from Mobay Chemical Co. as DESMODUR IL.

Initiator A—was 4-tetrahydrothiophenium 2-methylphenoxide represented by the structural formula:

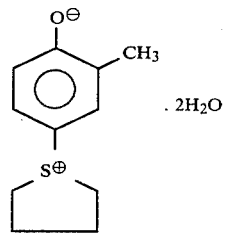

Catalyst B—was a 33% solution of triethylenediamine in dipropylene glycol.

Catalyst C—was bis(2-dimethylaminoethyl)ether.

Catalyst D—was dibutyltin dilaurate.

Catalyst E—was 3-dimethylamino-N',N-dimethyl propionamide.

Cell Control Agent A—was a silicone copolymer surfactant commercially available from Dow Corning Corp. as DC 193.

Cell Control Agent B—was a silicone surfactant commercially available from Union Carbide as Y 6677.

EXAMPLE 1 (Preparation of a Rigid Isocyanurate-Urethane Foam)

Components:
 50 parts by weight of Polyol A
 50 parts by weight of Polyol B
 80 parts by weight of trichlorofluoromethane
 10 parts by weight of Cell Control Agent A
 12 parts by weight of Initiator A
 712.6 parts by weight of Polyisocyanate A
 NCO:OH ratio = 6:1 (Isocyanate Index = 600)

The rigid isocyanurate-urethane foam was prepared by adding the polymer isocyanate to the mixture of Polyol A with the trichlorofluoromethane and silicone surfactant. Finally the initiator dissolved in Polyol B was added and stirred until the onset of creaming and then immediately poured into a paper box. The cream time, rise time and tack free time of the foaming process were measured. The foam was cured in an oven at 100° C. for 24 hours, then a week at room temperature prior to testing. The resultant foam had the following properties:

| | |
|---|---|
| Cream time | 4 seconds |
| Rise time | 14 seconds |
| Tack Free Time | 14 seconds |
| Density | 2.11 lbs/ft$^3$ (0.0338 g/cc) |
| Friability | 15.87% |
| Compressive strength | |
| parallel to rise | 20.5 psi (1.44 kg/cm$^2$) |
| perpendicular to rise | 22.21 psi (1.56 kg/cm$^2$) |

EXAMPLE 2 (Flexible Urethane Foam)

Components:
 60 parts by weight of Polyol C
 40 parts by weight of Polyol D
 2.6 parts by weight of water
 1.2 parts by weight of Cell Control Agent B
 10 parts by weight of Initiator A
 36.7 parts by weight of Polyisocyanate B
 NCO:OH ratio was 1.12:1 (Isocyanate Index = 112)

The flexible foam was prepared by the one step method by adding the foam components in the following order: initiator, H$_2$O, polyols, surfactant and, after intensive mixing, the isocyanate. The whole mixture was stirred until the onset of creaming and then immediately poured into a mold preheated to 100° C. and cured for 30 minutes in an oven at 90° C.

The foam had the following properties:

| | |
|---|---|
| Cream time | 25 seconds |
| Rise time | 75 seconds |
| Tack Free Time | 295 seconds |
| Density | 2.84 lbs/ft$^3$ (0.0455 g/cc) |

EXAMPLE 3 (Flexible Isocyanurate-Urethane Foam)

A. Preparation of a Solution of Partially Trimerized 2,4-Toluene Diisocyanate 100 ml of 2,4-toluene diisocyanate was placed into a reaction vessel maintained at 25° C. and fitted with a means for maintaining a nitrogen atmosphere. After the 2,4-toluene diisocyanate had reached a temperature of 25° C., 0.00691 grams of Initiator A dissolved in 1.48 ml

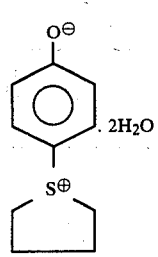

Initiator G—was 2,2-bis[3-(tetrahydrothiophenium)4-oxidophenyl]propane represented by the formula:

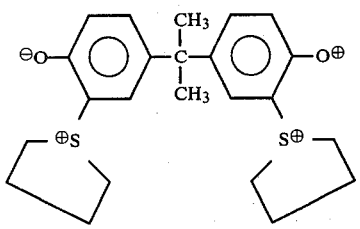

Initiator H—was 4-tetrahydrothiophenium 2,6-dimethyl-phenoxide represented by the formula:

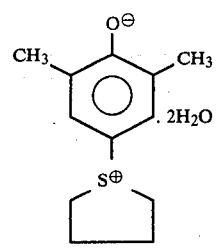

Initiator I—was 4-diethylsulfonium 2-methylphenoxide represented by the formula:

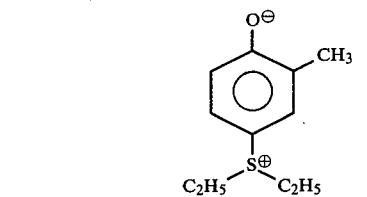

Catalyst J—was tetraethylammonium-2-methylphenoxide

TABLE I

| Run No. | Isocyanate type/grams | Other Reactant type/grams | Solvent type/grams | Initiator or Catalyst type/conc.[1] | Reaction Temp. °C. | Conditions Time hours | Yield grams/% | % NCO | Melting Point °C. | Infrared Bands cm$^{-1}$ |
|---|---|---|---|---|---|---|---|---|---|---|
| 1. | F/11.9 | A/0.9 | A/50 | F/0.0005 | 20 | initial | — | 6.18 | — | — |
|  |  |  |  |  |  | 1 | 12.8/100 | 0 | 242 | 3310; 3190; 3120; 1640; 1530 |
| 2. | F/11.9 | B/6.0 | A/50 | A/0.0005 | 10 | initial | — | 6.03 | — | — |
|  |  |  |  |  |  | 6 | 17.9/100 | 0 | 52 | 3310; 1730; 1230; 1530 |
| 3. | F/10 | none | none | G/0.005 | 25 | initial | — | 42 | — | — |
|  |  |  |  |  |  | 1 | 1.12/11.2 | 37.3 | — | — |
|  |  |  |  |  |  | 2 | 1.93/19.3 | 33.9 | 280.5 | 1710; 1220 |
| 4. | H/50 | none | A/50 | H/0.0003 | 45 | initial | — | 29.35 | — | — |
|  |  |  |  |  |  | 1/6 (10 min.) | 28.9/57.8 | 12.38 | — | — |
|  |  |  |  |  |  | 1/2 (30 min.) | 34.8/69.6 | 8.95 | — | — |
|  |  |  |  |  |  | 1 | 39.1/78.2 | 6.41 | — | — |
|  |  |  |  |  |  | 2 | — | gelled | — | 1700; 1710; 2270 |
| 5. | H/50 | none | B/50 | H/0.0025 | 25 | initial | — | 17.42 | — | — |
|  |  |  |  |  |  | 1/3 (20 min.) | 19.15/38.3 | 10.74 | — | — |
|  |  |  |  |  |  | 1 | 20.6/41.2 | 10.24 | — | — |
|  |  |  |  |  |  | 2 | — | gelled | — | 1700–1710; 2270 |
| 6. | G/8.7 | C/4.6 | B/50 | G/0.001 | 25 | initial | — | 9.13 | — | — |
|  |  |  |  |  |  | 1 | 8.09/60.8 | 3.58 | — | — |
|  |  |  |  |  |  | 2 | 13.3/100 | 0 | — | 3310; 1730–1740 |
| 7. | I/8.4 | D/6 | C/50 | A/0.001 | 25 | initial | — | 5.96 | — | — |
|  |  |  |  |  |  | 2/3 (40 min.) | 1.85/15.7 | 5.02 | — | — |
|  |  |  |  |  |  | 1 | 2.49/17.3 | 4.92 | — | — |
|  |  |  |  |  |  | 2 | 3.37/23.3 | 3.57 | — | 3315; 1730–1740 |
| 8. | I/50 | none | B/50 | F/0.0007 | 35 | initial | — | 17.61 | — | — |
|  |  |  |  |  |  | 0.42 (25 min.) | 3.405/6.81 | 16.41 | — | — |
|  |  |  |  |  |  | 1 | 3.945/7.89 | 16.22 | — | — |
|  |  |  |  |  |  | 2 | 4.945/9.82 | 15.98 | — | — |
|  |  |  |  |  |  | 14 | 5.31/10.62 | 15.74 | — | 1700–1710 |
| 9. | A/50 | none | A/50 | F/0.001 | 50 | initial | — | 15.97 | — | — |
|  |  |  |  |  |  | 0.42 (25 min.) | 0.57/1.13 | 15.79 | — | — |

TABLE I-continued

| Run No. | Isocyanate type/grams | Other Reactant type/grams | Solvent type/grams | Initiator or Catalyst type/conc.[1] | Reaction Temp. °C. | Conditions Time hours | Yield grams/% | Product Characterization |  |  |
|---|---|---|---|---|---|---|---|---|---|---|
|  |  |  |  |  |  |  |  | % NCO | Melting Point °C. | Infrared Bands cm$^{-1}$ |
|  |  |  |  |  |  | 1 | 2.505/5.01 | 15.17 | — | — |
|  |  |  |  |  |  | 2 | 3.445/6.89 | 14.87 | — | — |
|  |  |  |  |  |  | 14 | 4.135/8.27 | 14.65 | — | 1710; 2270 |
| 10. | G/50 | none | B/50 | I/0.0003 | 25 | initial | — | 27.93 | — | — |
|  |  |  |  |  |  | 1/20 (5 min.) | 5.84[2] | 26.3 | — | — |
|  |  |  |  |  |  | 1/2 (30 min.) | 14.79[2] | 23.8 | — | — |
|  |  |  |  |  |  | 1 | 24.45[2] | 21.09 | — | — |
|  |  |  |  |  |  | 2 | 39.78[2] | 16.82 | — | — |
|  |  |  |  |  |  | 16 | 68.99[2] | 8.66 | — | — |
|  |  |  |  |  |  | 20 | 69.42[2] | 8.54 | — | — |
|  |  |  |  |  |  | 45 | 69.8[2] | 8.43 | — | — |
|  |  |  |  |  |  | 62 | 69.98[2] | 8.41 | — | — |
| 11.* | B/50 | none | B/50 | J/0.0003 | 25 | initial | — | 27.93 | — | — |
|  |  |  |  |  |  | 0.15 (9 min.) | 6.19[2] | 26.2 | — | — |
|  |  |  |  |  |  | 0.50 (30 min.) | 10.92[2] | 24.88 | — | — |
|  |  |  |  |  |  | 2 | 43.86[2] | 15.68 | — | — |
|  |  |  |  |  |  | 7 | 69.99[2] | 8.38 | — | — |
|  |  |  |  |  |  | 16 | 76.94[2] | 6.44 | — | — |
|  |  |  |  |  |  | 20 | 81.27[2] | 5.23 | — | — |
|  |  |  |  |  |  | 24 | — | gel | — | — |

*not an example of the invention.
[1] concentration expressed as moles per liter of total reaction mixture
[2] % conversion rather than yield As evidenced by Run No. 10 of Table I, the non-cyclic sulfonium zwitterions are also effective catalysts for the production of stable NCO-terminated isocyanate oligomers (trimers). Run Nos. 1–9 show that various cyclic zwitterions are effective initiators for both trimerization and polyurethane reactions. It should be noted that, in Run Nos. 4 and 5, the gelation indicates the solubility limit of the particular solvent. After gelation, further determination of % NCO is not practical. Comparative Run No. 11 shows that not only do conventional catalysts produce instable trimers but also have slower rates of NCO conversion.

EXAMPLE 7 (Reverse Addition Technique)

As evidence of a preferred technique for making NCO-terminated cyanurate trimers, 0.1842 g of Initiator A dissolved in 1.89 ml. of acetonitrile is added to a stirred reaction vessel containing 50 ml. of butyl acetate. To the vessel at 25° C. is then slowly added with stirring a 50-ml. portion of a mixture of 80% 2,4-toluene diisocyanate and 20% 2,6-toluene diisocyanate. The percent NCO and percent conversion were measured periodically and the results are as follows:

| Time, Hrs. | % NCO | % Conversion |
|---|---|---|
| 0 | 29.35 | — |
| 4 | 10.10 | 65.59 |
| 6 | 9.87 | 66.37 |
| 18 | 9.50 | 67.63 |
| 168 | 9.42 | 67.90 |

As evidenced by the foregoing results, the reaction is essentially complete after 4 hours.

EXAMPLE 8 (1-Nylon Preparation)

To a reaction vessel containing Initiator A dissolved in acetonitrile is added with stirring phenyl isocyanate at a rate and under conditions such that the reactants are maintained at −40° C. Three runs using different amounts of Initiator A are made following this procedure. The amounts in moles of initiator and isocyanate used per 1 kg of total reaction mixture as well as the % NCO periodically observed are recorded in the following Table II. The amounts of methanol-insoluble 1-nylon obtained are also measured and recorded in Table II.

TABLE II

| Run No. | Initiator mole/kg | Isocyanate mole/kg | % NCO, 0 | 1 min. | 4 min. | 8 min. | % 1-Nylon |
|---|---|---|---|---|---|---|---|
| 1 | 0.000759 | 0.634 | 2.658 | 2.078 | 1.318 | 1.054 | 36.7 |
| 2 | 0.00101 | 0.8567 | 3.560 | 2.230 | 1.309 | 1.043 | 37.2 |
| 3 | 0.000632 | 0.634 | 2.658 | 2.213 | 1.462 | 1.267 | 36.4 |

The remaining product is soluble in methanol and is determined to be trimerized phenyl isocyanate.

What is claimed is:

1. A process for reacting an organic isocyanate with an active hydrogen compound, which comprises contacting the reactants with an ar-sulfonium areneoxide present in an amount and under conditions sufficient to initiate the reaction of said reactants.

2. The process of claim 1 wherein the isocyanate is partially trimerized to form a NCO-terminated isocyanurate oligomer.

3. The process of claims 1 or 2 wherein the isocyanate is an organic polyisocyanate containing at least two isocyanate groups per molecule.

4. The process of claim 3 wherein the polyisocyanate is 2,4-toluene diisocyanate, 2,6-toluene diisocyanate, 1,3-bis(isocyanatomethyl)benzene, hexamethylene diisocyanate, 4,4'-diisocyanatophenyl methane, 4,2'-diisocyanatophenyl methane, 2,2'-diisocyanatophenyl methane and mixtures thereof.

5. The process of claim 1 wherein the ar-sulfonium areneoxide is an ar-sulfonium areneoxide represented by the formula:

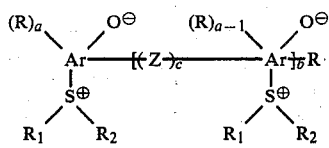

wherein each Ar is independently a cyclic aromatic polyyl, each R is independently a suitable inert monovalent radical capable of existing as a substituent on Ar, each Z is independently a suitably inert divalent radical capable of bridging aromatic moieties, each $R_1$ and each $R_2$ are independently suitably inert monovalent organic radicals and/or each $R_1$ and $R_2$ are collectively a suitably inert divalent organic radical capable of forming a heterocyclic ring with

a is a positive integer corresponding to the remaining available positions on Ar, b is 0 or a positive integer, and c is 0 or 1.

6. The process of claim 5 wherein each Ar is a polyyl of benzene, each R is independently H, Cl, Br, OH, R', —OR', —SR',

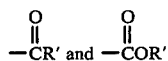

wherein R' is hydrocarbyl or substituted hydrocarbyl wherein the substituents are Cl, Br, —OR' or —SR'; each Z is independently —O—, —S—,

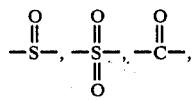

—$R_3$—, —$OR_3O$—, —$SR_3S$—, —$R_3O$—, —$R_3S$— and

wherein $R_3$ is hydrocarbylene or substituted hydrocarbylene and the substituents are as defined for R; each $R_1$ and $R_2$ are individually hydrocarbyl or substituted hydrocarbyl wherein the substituents are as defined in R, or each $R_1$ and $R_2$ are collectively hydrocarbylene, substituted hydrocarbylene, heterohydrocarbylene or substituted heterohydrocarbylene wherein the substituents are as defined in R provided that hydrocarbylene or heterohydrocarbylene are of length such that

is a 5- to 7-membered ring; b is 0–5, and c is 1.

7. The process of claim 6 wherein each R is independently H, Cl or alkyl; each Z is independently alkylene, alkylidene, —S—, —O— or oxyalkyleneoxy, each $R_1$ and $R_2$ are individually alkyl or aryl or $R_1$ and $R_2$ are collectively alkylene provided that

is a 5-membered ring and b is 0 or 1.

8. The process of claim 1 wherein the ar-sulfonium areneoxide is 4-tetrahydrothiophenium, 2-methyl-phenoxide, 4-tetrahydrothiophenium 2,6-dimethyl-phenoxide or 4-tetrahydrothiophenium phenoxide.

9. The process of claim 1 wherein the isocyanate is reacted with a hydroxyl component.

10. The process of claim 9 wherein the hydroxyl component is water, a polyol having at least two alkanol groups per molecule or mixtures thereof and the isocyanate is an organic polyisocyanate containing at least two isocyanate groups per molecule.

11. The process of claim 4 wherein the polyol is an adduct of ethylene oxide, propylene oxide or mixtures thereof with glycerine, ethylene glycol, propylene glycol, dipropylene glycol, trimethylolpropane, pentaerythritol, sorbitol, sucrose or polymer/polyols based on polyether glycols or triols.

12. The process of claim 10 for producing a polyurethane foam wherein the hydroxyl component is a mixture of water and polyol and the process is carried out such that the gaseous reaction product of the water and isocyanate serve as a blowing agent to produce the polyurethane foam.

13. The process of claim 1 wherein the ar-sulfonium areneoxide is dissolved in a non-reactive solvent before being contacted with the isocyanate and active hydrogen compound.

14. The process of claim 1 wherein the reaction is carried out by a reverse addition procedure in which the isocyanate is added to a solution of the ar-sulfonium areneoxide and active hydrogen compound.

15. The process of claim 10 for preparing an isocyanurate-containing polyurethane wherein in a single step a reaction mixture containing the organic polyisocyanate, the polyol and the ar-sulfonium areneoxide is subjected to reaction conditions such that the areneoxide initiates both the reaction of the polyisocyanate to form an NCO-terminated isocyanurate oligomer and the reaction of the NCO groups of the polyisocyanate and the oligomer with the polyol to form polyurethane.

16. The process of claim 6 wherein each $R_1$ and $R_2$ are independently alkyl groups or substituted alkyl groups having from 1 to 20 carbon atoms.

17. The process of claim 16 wherein each $R_1$ and $R_2$ are independently alkyl groups or substituted alkyl groups having from 1 to 8 carbon atoms.

18. The process of claim 17 wherein $R_1$ and $R_2$ are each selected independently from methyl, ethyl, propyl or butyl groups.

19. The process of claim 18 wherein each $R_1$ and $R_2$ is an ethyl group.

20. The process of claim 19 wherein the ar-sulfonium areneoxide is 4-diethylsulfonium 2-methyl-phenoxide represented by the formula

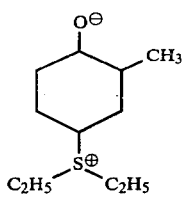

21. The process of claim 17 wherein said substituted alkyl groups are hydroxyl substituted alkyl groups.

22. The process of claim 1 wherein the ar-sulfonium areneoxide is present in quantities of from about 0.001 to about 0.1 mole per mole of NCO group and the reaction is conducted at a temperature of from about $-100°$ C. to about 130° C.

23. The process of claim 22 wherein the quantities of ar-sulfonium areneoxide is from about 0.0001 to about 0.001 mole per mole of NCO group and the temperature employed is from about $-100°$ C. to about 100° C.

* * * * *

UNITED STATES PATENT AND TRADEMARK OFFICE
CERTIFICATE OF CORRECTION

PATENT NO. : 4,220,728
DATED : September 2, 1980
INVENTOR(S) : Jiri Kresta and Chen S. Shen It is certified that error appears in the above-identified patent and that said Letters Patent are hereby corrected as shown below:

Column 9, line 19; change "quasiprepolymers" to --quasi-prepolymers--.

Column 10, line 66; change "from" to --form--.

Column 11, line 27; insert --wherein-- between "invention" and "the".

Column 12, line 9; insert --about-- between "to" and "20".

Column 12, line 37; change "drogencontaining" to --drogen-containing--.

Column 12, line 42; change "or" to --of--.

Column 13, line 40; change "Polyisocyante" to --Polyisocyanate--.

Column 16, line 5; insert --mil-- between "8" and "draw-down".

UNITED STATES PATENT AND TRADEMARK OFFICE
CERTIFICATE OF CORRECTION

PATENT NO. : 4,220,728

DATED : September 2, 1980

INVENTOR(S) : Jiri Kresta and Chen S. Shen

It is certified that error appears in the above-identified patent and that said Letters Patent are hereby corrected as shown below:

In Column 17, formula between lines 15 and 20; change symbol "$O^\oplus$" to --$O^\ominus$--. Formula should read as:

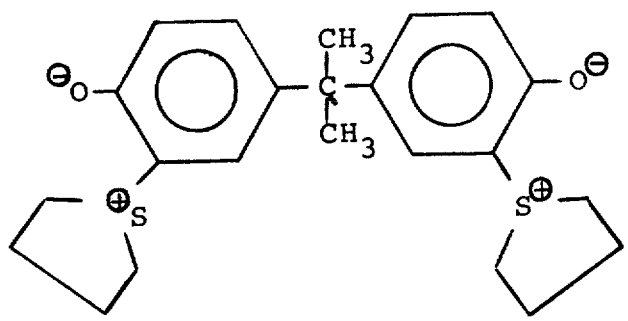

Signed and Sealed this

Thirteenth Day of January 1981

[SEAL]

Attest:

SIDNEY A. DIAMOND

Attesting Officer

Commissioner of Patents and Trademarks